United States Patent [19]

DeMartino

[11] Patent Number: 4,766,171

[45] Date of Patent: Aug. 23, 1988

[54] ORGANIC NONLINEAR OPTICAL SUBSTRATES

[75] Inventor: Ronald N. DeMartino, Wayne, N.J.

[73] Assignee: Hoechst Celanese Corporation, Somerville, N.J.

[21] Appl. No.: 836,135

[22] Filed: Mar. 4, 1986

Related U.S. Application Data

[62] Division of Ser. No. 771,864, Sep., 1985, Pat. No. 4,717,508.

[51] Int. Cl.⁴ .......................... C08L 33/26; H01S 3/16; H03F 7/00
[52] U.S. Cl. .................................... 524/722; 524/725; 524/827; 372/21; 307/425; 350/311; 252/582; 252/600
[58] Field of Search .......................... 372/21; 307/425; 350/311, 353, 362; 252/582, 600; 524/725, 722, 827

[56] References Cited

U.S. PATENT DOCUMENTS

| | | |
|---|---|---|
| 3,371,220 | 10/1966 | Flevry, V et al. .................. 307/425 |
| 3,395,329 | 7/1968 | Rentzepis ............................ 307/427 |
| 3,895,242 | 7/1975 | Yoshida ................................ 307/425 |
| 3,965,375 | 6/1976 | Bergman, Jr. et al. ............ 307/88.5 |
| 4,199,698 | 4/1980 | Bethea et al. ....................... 307/425 |
| 4,376,899 | 3/1983 | Chemia et al. ...................... 307/425 |
| 4,428,873 | 1/1984 | Murayama et al. ................. 252/583 |
| 4,431,263 | 2/1984 | Garito ............................... 350/96.34 |

OTHER PUBLICATIONS

Drabovich et al., "Tunable Resonant...", Optics Communications, vol. 20, No. 3, Mar. 1977, pp. 350-353.
Williams, "Organic Polymeric...", Angew. Chem. Int. Ed. Engl. 23 (1984) 690-703.
Davydov et al., "New Nonlinear...", Sov. J. Quantum Electron, vol. 7, No. 1, Jan. 1977.
Tomaru et al., "Second Harmonic Generation in Inclusion Complexes", J. Chem. Soc. Chem. Commun. 1984, No. 18, Sep. 15, 1984.
Jeunhomme, *Single Mode Fiber Optics*, Marrel Dekker Publ., pp. 257-268.
"Scientists Seek Nonlinear Optical Materials", Chem. Eng. News., Oct. 4, 1982, pp. 18-22.
Zyss, "New Organic Molecular Materials for Nonlinear Optics", J. Non-Cryst. Solids, 47.2 (1982) pp. 211-226.
Sigelle et al., "A New Material for Nonlinear Optics...", J. Non-Cryst. Solids, 47.2 (1982) 287-290.
Wilson et al., *Optoelectronics, An Introduction*, Prentice Hall Publ., pp. 116-125.

*Primary Examiner*—Matthew A. Thexton
*Assistant Examiner*—Catherine S. Kilby
*Attorney, Agent, or Firm*—Depaoli & O'Brien

[57] ABSTRACT

This invention provides organic solid solutions which exhibit nonlinear optical properties.

Illustrative of the invention is an optically clear solid solution of poly(N,N-dimethylacrylamide) and 13,13-di(n-hexydecylamino)-14,14-dicyano-4,5,9,10-tetrahydropyrenoquinodimethane.

6 Claims, No Drawings

ORGANIC NONLINEAR OPTICAL SUBSTRATES

This invention was made with Government support under Contract No. F49620-85-C-0047 awarded by the Department of Defense (DOD). The Government has certain rights in this invention.

This is a division of application Ser. No. 771,864 filed Sept. 3, 1985 now U.S. Pat. No. 4,717,508 issued Jan. 5, 1988.

BACKGROUND OF THE INVENTION

It is known that organic and polymeric materials with large delocalized π-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

In conjugated organic systems it is significant that the origin of the nonlinear effects is the charge asymmetric polarization of the π-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Of specific interest with respect to the present invention embodiments is prior art relating to thermoplastic polymers which exhibit solubility properties that encompass a broad compatibility range with both hydrophilic and hydrophobic types of organic solvents. Such thermoplastic polymers generally contain recurring units of at least one water-soluble monomer such as acrylamide, as described in U.S. Pat. Nos. which include 3,070,558; 3,354,084; 3,658,734; 4,115,339; 4,254,249; 4,395,524; and 4,521,580; incorporated by reference.

A pertinent prior art reference with respect to the present invention is U.S. Pat. No. 4,428,873 which describes an electrooptical solid element comprising a low molecular weight polar substance having a Kerr type electrooptical effect, and an organic polymer substance compatible with the low molecular weight polar substance.

Other light switching or modulating optical systems of interest are described in U.S. Pat. Nos. 2,441,019; 3,215,338; 3,317,266; 4,128,496; and 4,199,698.

There is continuing research effort to develop new organic optical systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide novel organic nonlinear optical substrates.

It is another object of this invention to provide organic nonlinear optical substrates exhibiting a high $\chi^{(2)}$ susceptibility value.

It is another object of this invention to provide a polymeric nonlinear optical medium characterized by a high Miller's delta, and a high optical damage threshold.

It is a further object of this invention to provide an optically transparent substrate which comprises a host polymer component, and a guest organic compound component which exhibits nonlinear optical susceptibility.

Other objects and advantages of the present invention shall become apparent from the accompanying description and examples.

DESCRIPTION OF THE INVENTION

One or more objects of the present invention are accomplished by the provision of an optically transparent solid solution comprising a homogeneous blend of an organic compound component which exhibits nonlinear optical response, and a thermoplastic polymer component which contains a recurring monomeric unit corresponding to the formula:

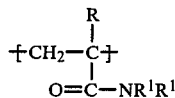

where R is a substituent selected from hydrogen, methyl and ethyl groups, and $R^1$ is an alkyl substituent containing between about 1–4 carbon atoms.

In another embodiment this invention provides a nonlinear optical medium in the form of a homogeneous single phase solid substrate comprising (1) a host thermoplastic polymer which contains a recurring monomeric unit corresponding to the formula:

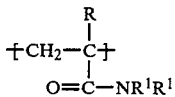

where R is a substituent selected from hydrogen, methyl and ethyl groups, and $R^1$ is an alkyl substituent containing between about 1–4 carbon atoms; and (2) a guest organic compound which has a charge asymmetric electronic structure and exhibits nonlinear optical response.

In a preferred embodiment, the organic compound component of the nonlinear optical medium is present in a quantity of at least about 25 weight percent based on the total substrate weight.

Nominally a nonlinear optical medium of the present invention can exhibit a Miller's delta of at least about one square meter/coulomb, and a second-order nonlinear optical susceptibility $\chi^{(2)}$ of at least about $1 \times 10^{-6}$ esu.

The term Miller's delta" as employed herein with respect to second harmonic generation (SHG) is defined by Garito et al in Chapter 1, "Molecular Optics:-Nonlinear Optical Properties Of Organic And Polymeric Crystals"; ACS Symposium Series 233 (1983).

The quantity "delta" ($\delta$) is defined by the equation:

$$d_{ijk} = \epsilon_o \chi_{ii}{}^{(1)} \chi_{jj}{}^{(1)} \chi_{kk}{}^{(1)} \delta_{ijk}$$

where terms such as $\chi_{ii}{}^{(1)}$ are the linear susceptibility components, and $d_{ijk}$, the second harmonic coefficient, is defined through $$\chi_{ijk}{}^{(2)}(-2\omega; \omega,\omega) = 2\, d_{ijk}(-2\omega; \omega,\omega)$$

The Miller's delta ($10^{-2}$ m²/c at 1.06 μm) of various nonlinear optical crystalline substrates are illustrated by KDP (3.5), LiNbO₃ (7.5), GaAs (1.8) and 2-methyl-4-nitroaniline (160).

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic frequencies is phase matched in the medium. The phase matching can provide a high conversion percentage of the incident light to the second harmonic wave. The term "external field" as employed herein refers to an electric or magnetic field which is applied to a substrate of mobile organic molecules, to induce dipolar alignment of the molecules parallel to the field.

The term "optically transparent" as employed herein refers to a liquid or solid medium which is transparent or light transmitting with respect to incident fundamental light frequencies and harmonic light frequencies. In a laser frequency converter, a present invention nonlinear optical lens medium is transparent to both the incident and exit light frequencies.

The term "solid solution" as employed herein refers to a homogeneous single phase alloy of guest organic compound and host polymer components. The guest organic compound is not detectable as physically discrete crystallites in the polymer matrix. Solid solutions are illustrated in U.S. Pat. No. 4,428,873.

Thermoplastic Polymer Component

An essential feature of the present invention nonlinear optical media is the selection of a host polymer component with high solvating power with respect to a guest organic compound component.

The magnitude of second-order and third-order nonlinear optical response of a present invention type guest/host optical substrate is directly proportional to the quantity of charge asymmetric guest organic compound in the optical substrate. The magnitude of the nonlinear response increases as the number of guest organic molecules in the optical substrate increases.

It is critical that the guest organic compound is "dissolved" in the host polymer, i.e., that a homogeneous solid solution of guest organic compound and host polymer is achieved.

When the guest organic compound is dissolved in a host polymer matrix, the magnitude of nonlinear response is greater than if the same organic compound in the same quantity is not dissolved in the host polymer but instead is present as a physically discrete phase.

Further, the magnitude of second-order and third-order nonlinear optical response is greater in a guest/host optical substrate when a present invention host polymer is employed as the guest/host matrix, as compared with a guest/host optical substrate employing a host polymer matrix not in accordance with the present invention. For example, under comparable conditions a present invention guest/host optical substrate employing a herein defined polyacrylamide as a polymer matrix provides a more efficient nonlinear optical response than a guest/host optical substrate employing a host polymer matrix such as poly(methyl methacrylate), polystyrene, polyvinylchloride, ABS resin or polyethylene.

A present invention host polymer preferably is one which contains a recurring monomeric unit corresponding to the formula:

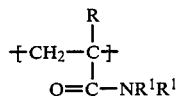

where R is a substituent selected from hydrogen, methyl and ethyl groups, and R¹ is an alkyl substituent containing between about 1-4 carbon atoms.

Illustrative of R¹ alkyl groups are methyl, ethyl, propyl, isopropyl, butyl and isobutyl. Alternatively, one of the R¹ groups can be hydrogen.

A present invention host polymer can have a weight average molecular weight between about 800–3,000,000, and typically will be in the range between about 1000–500,000.

A present invention host polymer can be either a homopolymer or a copolymer. In the case of a copolymer, the dialkylacrylamide recurring monomeric unit as represented in the above formula is at least about 60 mole percent of the copolymer molecule and preferably is at least about 80 mole percent.

Illustrative of monomers which can be copolymerized with dialkylacrylamide monomer are acrylonitrile, methacrylonitrile, alkyl acrylate, alkyl methacrylate, alkyl vinyl ether, maleic anhydride, vinyl halide, vinyl alkylate, styrene, alkene, alkadiene, and the like.

Polymerization procedures for preparing the polymers and copolymers are described in prior art such as U.S. Pat. Nos. 3,354,084; 4,115,339; 4,254,249; 4,395,524; and references cited therein.

NLO Responsive Organic Compound Component

The organic compound component which contributes nonlinear optical response properties to a present invention guest/host optical medium generally is a small molecule having a molecular weight less than about 1000.

The preferred NLO responsive molecule is one which has a charge asymmetric electronic structure consisting of an electron-withdrawing group which is in conjugation with an electron-donating group, and which exhibits a second-order nonlinear optical susceptibility $\beta$ of at least about $500 \times 10^{-30}$ esu.

Illustrative of suitable NLO responsive organic compounds are nitroaniline type structures such as 4-nitroaniline, 2-methyl-4-nitroaniline, 1-dimethylamino- 4-nitronaphthalene, 2-chloro-4-nitroaniline, 4-dimethylamino-4'-nitrostilbene, and the like.

Organic compounds which have exceptional nonlinear susceptibility properties are those having structures corresponding to the formula:

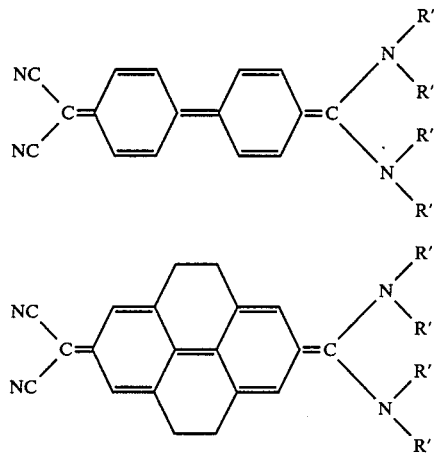

where R' is a substituent selected from hydrogen and alkyl ($C_1$–$C_{20}$) groups.

Illustrative of the above formulae are:
13,13-diamino-14,14-dicyanodiphenoquinodimethane
13,13-di(dimethylamino)-14,14-dicyanodiphenoquinodimethane
13,13-di(diethylamino)-14,14-dicyanodiphenoquinodimethane
13,13-di(n-hexadecylamino)-14,14-dicyanodiphenoquinodimethane
13,13-diamino-14,14-dicyano-4,5,9,10-tetrahydropyrenoquinodimethane
13,13-di(dimethylamino)-14,14-dicyano-4,5,9,10-tetrahydropyrenoquinodimethane
13,13-di(diethylamino)-14,14-dicyano-4,5,9,10-tetrahydropyrenoquinodimethane
13,13-di(n-hexadecylamino)-14,14-dicyano-4,5,9,10-tetrahydropyrenoquinodimethane
13,13-ethylenediamino-14,14-dicyanodiphenoquinodimethane
13,13-ethylenediamino-14,14-dicyano-4,5,9,10-tetrahydropyrenoquinodimethane The novel diphenoquinodimethane compounds are more fully described in U.S. Pat. No. 4,640,800; incorporated herein by reference.

Preparation Of Invention Guest/Host NLO Media

In another embodiment this invention provides a process for producing an optically transparent solid solution which comprises preparing a homogeneous blend of components comprising (1) an organic compound which exhibits nonlinear optical response, and (2) at least one polymerizable monomer corresponding to the formula:

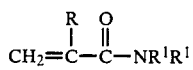

where R is a substituent selected from hydrogen, methyl and ethyl groups, and $R^1$ is an alkyl substituent containing between about 1-4 carbon atoms; and subjecting the homogeneous blend to polymerization conditions to produce a homogeneous solid solution of host polymer and guest organic compound which exhibits optical nonlinearity.

In a typical procedure, between about 0.05–1.0 weight percent, based on the monomer weight, of a free radical initiator is incorporated in the homogeneous blend of components, and polymerized at a temperature between about 15°–100° C. for a period of about 1–72 hours. Suitable free radical initiators include ammonium persulfate, dibenzoyl peroxide and azo-bis-isobutyronitrile.

The initial liquid phase homogeneous blend of guest-/host components and free radical initiator converts to a thermoplastic solid phase under polymerization conditions. The solid phase can be shaped into thin or bulk matrices by conventional means.

An invention optically transparent solid solution also can be prepared by dissolving the guest and host components in a common solvent, and subsequently removing the solvent medium. Suitable solvents include acetone, butanol, tetrahydrofuran, dimethylacetamide, ethyl acetate, 1-methyl-2-pyrrolidinone, 1-methyl-2-piperidine, gamma-butyrolactone, cyclohexanone, and the like.

Alternatively, an invention optically transparent solid solution can be prepared by admixing the guest and host components, and heating the admixture into a melt phase which subsequently forms a homogeneous solid solution when cooled to room temperature.

Nonlinear Optoelectronic Properties

The fundamental concepts of nonlinear optics and their relationship to chemical structures can be expressed in terms of dipolar approximation with respect to the polarization induced in an atom or molecule by an external field.

As summarized by Twieg and Jain in chapter 3 of ACS Symposium Series 233(1983), the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all molecules, but the even-order coefficients such as $\beta$ (responsible for second harmonic generation, SHG) are zero for centrosymmetric molecules. The odd order coefficient $\gamma$ is responsible for third-order harmonic generation (THG).

Equation (2) is identical with (1) except that it describes a macroscopic polariztaion, such as that arising from $$\Delta\mu = \mu_e - \mu_g = \alpha E + \beta EE + \gamma EEE + \ldots \quad (1)$$

$$P = P_O + \chi^{(1)}E + \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and harmonic wave. Birefringent crystals often possess propagation directions in which the refractive index for the fundamental $\omega$ and the second-harmonic $2\omega$ are identical so that dispersion may be overcome.

A present invention organic solid solution substrate typically is an optically transparent film or disc which exhibits hyperpolarization tensor properties such as second-harmonic and third-harmonic generation, Kerr effect, and the linear electrooptic (Pockels) effect. For second-harmonic generation, the bulk phase of the organic solid solution substrate does not possess a real or orientational average inversion center. The substrate is a macroscopic noncentrosymmetric dipolar structure.

Harmonic generation measurements relative to quartz can be performed to establish the value of second-order and third-order nonlinear susceptibility of the optically clear solid solution substrates.

A suitable apparatus for harmonic gneration is schematically represented in Macromolecules, 15, 1386 (1982). The apparatus is a Q-switched $Nd^{3+}/YAG$ laser configured as an unstable resonator with polarization output coupling. The laser is operated just above threshold, supplying 2–5 mJ per pulse of 1.06 $\mu$m radiation, which is focused on the surface of a thin nonlinear optical substrate (20–30 $\mu$m thickness). Variation of the laser polarization is accomplished with a double-quarter wave rhomb rotator. The harmonic light is collected with f/16 optics, filtered from the fundamental light, and passed through a 20-cm focal length grating monochromator with an 8 nm bandwidth. Detection is accomplished with an 11-stage amplified photomultiplier tube. The system is integrated with a computer-controlled gated electronic detection and digitization apparatus.

In the case of macroscopic nonlinear optical substrates that are composed of noncentrosymmetric sites on the molecular and unit cell level, the macroscopic second-order nonlinear optical response $\chi^{(2)}$ is comprised of the corresponding molecular nonlinear optical response $\beta$. In the rigid lattice gas approximation, the macroscopic susceptibility $\chi^{(2)}$ is expressed by the following relationship:

$$\chi_{ijk}(-\omega_3; \omega_1, \omega_2) = N f^{\omega_3} f^{\omega_2} f^{\omega_1} <\beta_{ijk}(-\omega_3; \omega_1; \omega_2)>$$

wherein N is the number of sites per unit volume, $f^\omega$ represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983) recited hereinabove; and by Lipscomb et al in J. Chem. Phys., 75, 1509 (1981), incorporated by reference. See also Lalama et al, Phys. Rev., A20, 1179 (1979); and Garito et al, Mol Cryst. and Liq. Cryst., 106, 219 (1984); incorporated by reference.

Field-induced Macroscopic Nonlinearity

The electronic origins of nonlinear optical effects in organic $\pi$-electronic systems are reviewed by D. J. Williams in Angew. Chem. Int. Ed. Engl., 23, 690 (1984), incorporated herein by reference.

As described in the review article, a technique has been developed for measuring $\beta$ without necessitating the incorporation of the molecule into noncentrosymmetric crystal structures. In this technique, called electric field-induced second-harmonic generation (EFISH), a strong DC electric field is applied to a liquid or a solution of the molecules of interest in order to remove the orientational averaging by statistical alignment of molecular dipoles in the medium. The induced second-order nonlinearity can then produce a signal at $2\omega$, from which $\beta$ can be extracted.

A schematic diagram of experimental system for measurement of $\beta$ by the EFISH technique is presented in the review article. As illustrated in the diagram, the 1.06 $\mu$m output of a $Nd^{3+}$:YAG laser is split and directed into a sample and a reference cell. The sample cell is translated by a stepped-motor-controlled stage across the beam. The laser pulse is synchronized with a high-voltage DC pulse to induce harmonic generation in the cell. The 0.53 $\mu$m radiation is separated from the 1.06 $\mu$m pump beam by filters and a monochromator, and the harmonic intensity is detected by a photomultiplier tube. The signal-to-noise ratio can be improved with a boxcar averager. The reference beam is directed into a crystal such as quartz, whose second-order properties are well known, so that fluctuations in beam intensity can be readily corrected in the output data. The value of the nonlinear coefficient is obtained from the ratio of the signals of the sample cell and a reference material such as quartz or $LiNbO_3$ with known $\chi^{(2)}$.

Electric field-induced second-harmonic generation (DCSHG) measurements of liquid solutions for $\beta$ determinations are also described by Garito et al in Phys. Rev., 28(12), 6766 (1983), incorporated by reference.

As noted previously, a guest organic compound which exhibits an extremely large value of $\beta$ is one containing a diphenoquinodimethane structure with charge asymmetry, such as 13,13-diamino-14,14-dicyanodiphenoquinodimethane (DCNDQA):

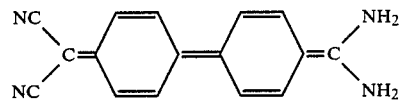

The DCNDQA molecule is characterized by a single excited state at 2.2 eV(0.6 $\mu$); a dipole moment difference of $\Delta\mu_1{}^x$:23D; a transition moment of $\mu^x{}_{1g}$:13.6D; and large 2 $\omega$ and $\omega$ contributions to $\beta$ of order $10^3$ at 1 $-0.6\mu$, and no interfering 2 $\omega$ resonance from higher excitations.

Solid Solution Guest/Host Molecular Orientation

If the distribution of guest molecules is random, there is orientational averaging by statistical alignment of the dipolar molecules in the polymeric host, and the optical substrate exhibits third order nonlinearity ($\chi^{(3)}$).

If the distribution of guest molecules is at least partially uniaxial in molecular orientation, then the optical substrate exhibits second-order nonlinearity ($\chi^{(2)}$). One method for preparing polymeric films with large second-order nonlinear coefficients is to remove the orientational averaging of a dopant molecule with large $\beta$ by application of an external DC electric field or magnetic field to a softened film. This can be accomplished by heating the film above the host polymer glass-transition temperature $T_g$, then cooling the film below $T_g$ in the presence of the external field. The poling provides the alignment predicted by the Boltzmann distribution law.

The formation of a thin host polymer substrate containing guest molecules having, for example, uniaxial orthogonal molecular orientation can be achieved by inducing a dipolar alignment of the guest molecules in the substrate with an externally applied field of the type described above.

In one method a thin film of the polymer [e.g., poly(N,N-dimethylacrylamide)] containing guest molecules (e.g., DCNDQA) is cast between electrode plates. The polymer substrate then is heated to a temperature above the second order transition temperature of the polymer. A DC electric field is applied (e.g., at a field strength between about 400–100,000 V/cm) for a period sufficient to align all of the guest molecules in a unidirectional orthogonal configuration parallel to the transverse field. Typically the orientation period will be in the range between about one second and one hour, as determined by factors such as guest molecular structure and field strength.

When the orientation of guest molecules is complete, the polymer substrate is cooled below its second-order transition temperature, while the substrate is still under the influence of the applied DC electric field. In this manner the uniaxial orthogonal molecular orientation of guest molecules is immobilized in a rigid structure.

The uniaxial molecular orientation of the guest molecules in the polymer substrate can be confirmed by X-ray diffraction analysis. Another method of molecular orientation measurement is by optical characterization, such as optical absorption measurements by means of a spectrophotometer with a linear polarization fixture.

The following examples are further illustrative of the present invention. The components and specific ingredients are presented as being typical, and various modifications can be derived in view of the foregoing disclosure within the scope of the invention.

Fluorescence activity in a nonlinear optical substrate is measured by Perkin-Elmer Fluorescence Spectroscopy Model No. MPF-66 or LS-5.

Optical loss exhibited by a nonlinear optical substrate is measured by optical time domain reflectometry or optical frequency-domain reflectometry as described in "Single-mode Fiber Optics" by Luc B. Jeunhomme, Marcel Dekker Inc., N.Y., 1984. It is also measured by the method described in "The Optical Industry And Systems Purchasing Directory", Photonics, 1984. The optical scattering loss is quantitatively measured by the ratio of perpendicular transmission to parallel transmission of a He-Ne laser beam through the nonlinear sample which is placed between crossed polarizers.

The response time of a nonlinear optical substrate is calculated by the method described in "Optoelectronics; An Introduction" by P. J. Deau, Editor, Prentice-Hall International.

The dielectric constant of a nonlinear optical substrate is measured by the methods described in Chapter XXXVIII of "Technique Of Organic Chemistry", Volume I, Part III, (Physical Methods Of Organic Chemistry) by Arnold Weissberger, Editor, Interscience Publishers Ltd., New York, 1960.

EXAMPLE I

This Example illustrates the preparation of 13,13-diamino-14,14-dicyano-4,5,9,10-tetrahydropyrenoquionodimethane, and a solid solution in accordance with the present invention.

A.

Ten grams of 13,13-14,14-tetracyano-4,5,9,10-tetrahydropyrenoquinodimethane prepared by the synthetic scheme previously described and 2 liters of tetrahydrofuran are placed in a three-necked three-liter flask equipped with a mechanical stirrer, a nitrogen inlet, a drying tube and a gas-inlet connected to an anhydrous ammonia gas tank. Ammonia gas is bubbled through the stirred solution for three days at room temperature. The crude product in precipitate form is filtered from the reaction mixture, washed with distilled water, and recrystallized from DMF-water to yield high purity 13,13-diamino-14,14-dicyano-4,5,9,10-tetrahydropyrenoquinodimethane product.

DC-induced second-harmonic generation (DCFISH) with the pure product can achieve a second-order nonlinear optical susceptibility $\beta$ of about $900 \times 10^{-30}$ esu, an optical susceptibility $\chi^{(2)}$ of about $3.1 \times 10^{-6}$ esu, and a Miller's delta of about 4 square meters/coulomb in the product.

When a NLO substrate of the product is centrosymmetric in macroscopic configuration, it can exhibit a nonlinear optical susceptibility $\chi^{(3)}$ of about $2 \times 10^{-12}$ esu, a response time of less than $10^{-13}$ second, an absence of fluorescence in the wavelength range between about 0.3–3 $\mu$m, an optical loss less than about $10^{-5}$ second, and a dielectric constant less than about 5.

B.

A mixture of 60 grams of poly(N,N-dimethylacrylamide) (weight average M.W. of 30,000) and 40 grams of the above quinodimethane product are melted to form a homogeneous liquid phase. Cooling yields an optically clear solid solution which exhibits nonlinear optical properties.

EXAMPLE II

This Example illustrates the preparation of 13,13-di(n-hexadecylamino)-14,14-dicyano-4,5,9,10-tetrahydropyrenoquinodimethane, and a solid solution in accordance with the present invention.

A.

A three-necked three-liter flask equipped with a mechanical stirrer, a nitrogen inlet, a drying tube, and an addition funnel is charged with 10 grams (0.03 moles) of 13,13,14,14-tetracyano-4,5,9,10-tetrahydropyrenoquinodimethane and two liters of tetrahydrofuran. Twenty-nine grams (0.12 moles) of n-hexadecylamine in 100 ml of tetrahydrofuran is added dropwise into the flask, and the resulting mixture is stirred for three days at room temperature. The resulting THF solution is concentrated on a rotary evaporator.

The crude product in precipitate form is separated by filtration, washed with distilled water, neutralized with 10% solution of ammonium hydroxide, washed with water, and then recrystallized from N,N-dimethylformamide-water to yield 13,13-di(n-hexadecylamino)-14,14-dicyano-4,5,9,10-tetrahydropyrenoquinodimethane.

This compound can be aligned in a melt-phase in a DC field by applying about 15K volts/cm, and cooled slowly to freeze the aligned molecular structure in the DC field. The aligned molecular substrate is optically transparent and can exhibit a nonlinear optical susceptibility $\beta$ of about $1000 \times 10^{-30}$ esu, a $\chi^{(2)}$ of about $3.3\times10^{-6}$ esu, and a Miller's delta of about 4 square meters/coulomb.

B.

A reaction flask is charged with 75 grams of N,N-diethylmethacrylamide (weight average M.W. of 80,000), 25 grams of the above quinodimethane product, and 0.1 gram of azo-bis-isobutyronitrile. The flask is purged with argon, then sealed and placed in a 60°–70° C. oil bath.

The resultant product is an optically clear solid solution which exhibits nonlinear optical properties.

EXAMPLE III

This Example illustrates the preparation of optically clear guest/host solid solutions in accordance with the present invention.

A series of polymerizations are conducted at 70°–80° C. for a period of 48 hours.

|  | Grams |  |  |
| --- | --- | --- | --- |
| Dimethylacylamide | 8 | 6 | 4 |
| Vanillin | 2 | 4 | 6 |
| Azo-bis-isobutyronitrile | 0.05 | 0.05 | 0.05 |
| Acrylamide | — | 1 | 1 |
| Dimethylmethacrylamide | 8 | 5 | 3 |
| 2-Methyl-4-nitroaniline | 2 | 4 | 6 |
| Benzoyl peroxide | 0.05 | 0.05 | 0.05 |

All of the resultant products are optically clear solid solutions which exhibit nonlinear optical properties.

If methyl methacrylate is employed as the polymerizable monomer, less homogeneous solid solutions are obtained which are less efficient as nonlinear optical substrates.

What is claimed is:

1. A process for producing an optically transparent solid solution which comprises preparing a homogeneous blend of components comprising (1) an organic compound which exhibits nonlinear optical response, and (2) at least one polymerizable monomer corresponding to the formula:

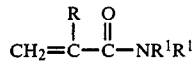

where R is a substituent selected from hydrogen, methyl and ethyl groups, and $R^1$ is an alkyl substituent containing between about 1–4 carbon atoms; and subjecting the homogeneous blend to polymerization conditions to produce a homogeneous solid solution of host polymer and guest organic compound which exhibits optical nonlinearity, wherein the organic compound component is present in a quantity of at least about 25 weight percent based on the total weight of organic components.

2. A process in accordance with claim 1 wherein the polymerizable monomer is N,N-dimethylacrylamide.

3. A process in accordance with claim 1 wherein the polymerizable monomer is N,N-dimethylmethacrylamide.

4. A process in accordance with claim 1 wherein the organic compound component contains a nitroaniline structure.

5. A process in accordance with claim 1 wherein the organic compound component contains a quinodimethane structure.

6. A process in accordance with claim 1 wherein in an additional procedure the solid solution is shaped into an optically transparent thin film.

* * * * *